(12) United States Patent
Mori (10) Patent No.: US 11,218,179 B2
(45) Date of Patent: Jan. 4, 2022

(54) RADIO FREQUENCY MODULE AND COMMUNICATION DEVICE

(71) Applicant: MURATA MANUFACTURING CO., LTD., Kyoto (JP)

(72) Inventor: Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/092,611

(22) Filed: Nov. 9, 2020

(65) Prior Publication Data

US 2021/0143845 A1 May 13, 2021

(30) Foreign Application Priority Data

Nov. 13, 2019 (JP) .............................. JP2019-205825

(51) Int. Cl.
*H04B 1/00* (2006.01)
*H04B 1/16* (2006.01)
*H04B 1/40* (2015.01)

(52) U.S. Cl.
CPC ........... *H04B 1/0057* (2013.01); *H04B 1/006* (2013.01); *H04B 1/16* (2013.01)

(58) Field of Classification Search
CPC ...... H04B 1/005; H04B 1/0057; H04B 1/006; H04B 1/04; H04B 1/0475; H04B 1/16; H04B 1/38; H04B 1/40; H04B 1/401; H04B 1/406; H04B 1/3827; H04W 84/12; H04W 88/02
See application file for complete search history.

(56) References Cited

U.S. PATENT DOCUMENTS

| | | | |
|---|---|---|---|
| 10,009,956 B1* | 6/2018 | Feher | H04W 88/02 |
| 10,257,119 B2 | 4/2019 | Wloczysiak et al. | |
| 10,348,346 B2* | 7/2019 | Ramasamy | H04B 1/3838 |
| 10,659,121 B2* | 5/2020 | Pehlke | H04B 1/40 |
| 10,727,894 B2* | 7/2020 | Thompson | H04B 1/005 |
| 10,772,052 B2* | 9/2020 | O'Shea | H04B 1/406 |
| 2011/0159823 A1* | 6/2011 | Lo | H04B 1/005 455/78 |
| 2020/0366320 A1* | 11/2020 | An | H04B 1/0057 |

OTHER PUBLICATIONS

Ericsson, Overview of Requirements for CA Between Licensed Band NR PCell and NR-U SCells, 3GPP TSG-RAN WG4 Meeting #90-Bis, Apr. 8-12, 2019, pp. 1-3, R4-1904176, Xi'an, P.R. of China.

* cited by examiner

*Primary Examiner* — Quochien B Vuong
(74) *Attorney, Agent, or Firm* — Pearne & Gordon LLP (57) ABSTRACT

A radio frequency circuit includes: a first filter having a passband corresponding to a first frequency band of at least 5 gigahertz and less than a predetermined frequency; a second filter having a passband corresponding to a second frequency band of at least the predetermined frequency; a switch configured to switch connection of the first filter between a first transfer circuit and a third transfer circuit. The first filter is connected between a first antenna connector terminal and the first transfer circuit and between the first antenna connector terminal and the third transfer circuit. The second filter is connected between a second antenna connector terminal and a second transfer circuit. A first communication system or a second communication system is a wireless local area network (WLAN) system.

8 Claims, 8 Drawing Sheets

RADIO FREQUENCY MODULE AND COMMUNICATION DEVICE

CROSS REFERENCE TO RELATED APPLICATION

The present application is based on and claims priority of Japanese Patent Application No. 2019-205825 filed on Nov. 13, 2019. The entire disclosure of the above-identified application, including the specification, drawings and claims is incorporated herein by reference in its entirety.

TECHNICAL FIELD

The present disclosure relates to radio frequency circuits and communication devices.

BACKGROUND

In a mobile communication system used for mobile phones or the like, the utilization and application of a frequency band that is available without a radio station license (hereinafter referred to as "unlicensed band") are under consideration. In the third generation partnership project (3GPP), for example, a licensed-assisted access (LAA) for using, as a long-term evolution (LTE) carrier, a 5 gigahertz unlicensed band for use in a wireless local area network (WLAN) in the fourth generation mobile communication system (4G) is standardized in Release 13.

In the LAA, an unlicensed band is used together with a frequency band that requires a radio station license (hereinafter referred to as "licensed band") for carrier aggregation (CA). U.S. patent Ser. No. 10/257,119 discloses a front-end configuration that enables the use of such LAA.

BRIEF SUMMARY

In the WLAN or the fifth generation mobile communication system (5G), the use of the 6 gigahertz band as an unlicensed band is under consideration and the simultaneous use of an unlicensed band in different communication systems is also under consideration. However, with the front-end configuration disclosed in U.S. patent Ser. No. 10/257,119, it is difficult to ensure necessary isolation between circuits in a front end in the simultaneous use of an unlicensed band in a plurality of communication systems.

In view of the above, the present disclosure provides a radio frequency circuit and a communication device capable of ensuring necessary isolation in the simultaneous use of an unlicensed band in a plurality of communication systems.

A radio frequency circuit according to one aspect of the present disclosure includes: a first filter having a passband corresponding to a first frequency band of at least 5 gigahertz and less than a predetermined frequency; a second filter having a passband corresponding to a second frequency band of at least the predetermined frequency; a first transfer circuit that transfers a signal of a first communication band for a first communication system, the first communication band being included in the first frequency band; a second transfer circuit that transfers a signal of a second communication band for the first communication system, the second communication band being included in the second frequency band; a third transfer circuit that transfers a signal of a third communication band for a second communication system different from the first communication system, the third communication band being included in the first frequency band; and a first switch that switches connection of the first filter between the first transfer circuit and the third transfer circuit. The first filter is connected between a first antenna connector terminal and the first transfer circuit and between the first antenna connector terminal and the third transfer circuit. The second filter is connected between a second antenna connector terminal and the second transfer circuit. One of the first communication system or the second communication system is a wireless local area network system.

With the radio frequency circuit according to one aspect of the present disclosure, it is possible to ensure necessary isolation in the simultaneous use of an unlicensed band in a plurality of communication systems.

BRIEF DESCRIPTION OF DRAWINGS

These and other advantages and features will become apparent from the following description thereof taken in conjunction with the accompanying Drawings, by way of non-limiting examples of embodiments disclosed herein.

DETAILED DESCRIPTION OF EMBODIMENTS

Hereinafter, exemplary embodiments of the present disclosure will be described in detail with reference to the drawings. It should be noted that each of the subsequently described exemplary embodiments shows a generic or specific example. The numerical values, shapes, materials, elements, the arrangement and connection of the elements, and others indicated in the following exemplary embodiments are mere examples, and therefore are not intended to limit the present disclosure. In addition, the sizes of the elements and the ratio of the sizes illustrated in the drawings are not necessarily accurate. In the drawings, elements which are substantially the same are given the same reference signs, and redundant description is omitted or simplified.

In a circuit configuration according to the present disclosure, if it is said that an element "is connected" to another element, the expression includes not only a case where the element is directly connected to another element via a connector terminal and/or a wiring conductor, but also a case where the element is electrically connected to another element via other circuit element. The term "is directly connected" used herein refers to a state in which an element is directly connected to another element via a connection terminal and/or a wiring conductor without other circuit element between the elements. If it is said that an element "is connected between A and B", this means that the element is connected to both A and B between A and B.

Embodiments

1. Circuit Configurations of Radio Frequency Circuit 1 and Communication Device 5
1.1 Circuit Configuration of Communication Device 5

Figure 1:
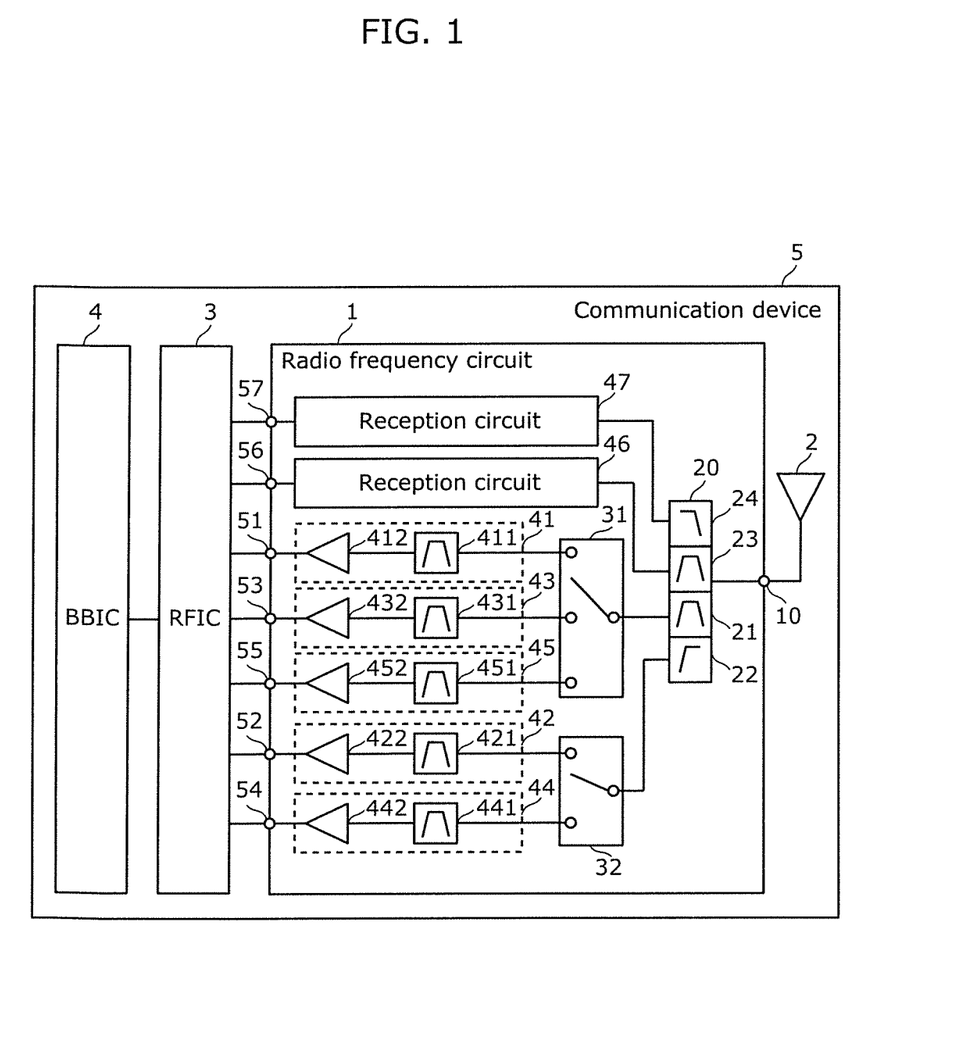
FIG. 1 is a circuit configuration diagram of a radio frequency circuit and a communication device according to an embodiment.

FIG. 1 is a circuit configuration diagram of radio frequency circuit 1 and communication device 5 according to an embodiment. As illustrated in FIG. 1, communication device 5 includes radio frequency circuit 1, antenna 2, RFIC 3, and BBIC 4.

Radio frequency circuit 1 transfers radio frequency signals between antenna 2 and RFIC 3. A detailed circuit configuration of radio frequency circuit 1 will be described later.

Antenna 2, which is connected to antenna connector terminal 10 of radio frequency circuit 1, receives radio frequency signals from outside and outputs the received radio frequency signals to radio frequency circuit 1.

RFIC 3 is one example of a signal processing circuit that processes radio frequency signals received by antenna 2. Specifically, RFIC 3 performs, by down-conversion, etc., signal processing on a radio frequency signal that is inputted via radio frequency circuit 1, and outputs a reception signal generated through the signal processing to BBIC 4.

BBIC 4 is a baseband signal processing circuit that performs signal processing using an intermediate frequency band including a frequency lower than a radio frequency signal transferred by radio frequency circuit 1. The signal processed by BBIC 4 is, for example, used as an image signal for image display or as a sound signal for conversation via a speaker.

RFIC 3 also functions as a controller to control, based on a communication band used, connections of switches 31 and 32 included in radio frequency circuit 1. Specifically, RFIC 3 conveys, to radio frequency circuit 1, control signals for switching the connections of switches 31 and 32 included in radio frequency circuit 1. RFIC 3 also functions as a controller to control, for instance, gains of low-noise amplifiers 412, 422, 432, 442, and 452 included in radio frequency circuit 1. Specifically, RFIC 3 conveys, to radio frequency circuit 1, control signals for adjusting, for instance, the gains of low-noise amplifiers 412, 422, 432, 442, and 452. Note that the functions of RFIC 3 as a controller may be implemented by a component outside RFIC 3 and may be implemented by BBIC 4, for example.

Note that in communication device 5 according to this embodiment, antenna 2 and BBIC 4 are not essential elements.

1.2 Circuit Configuration of Radio Frequency Circuit 1

Next, a detailed configuration of radio frequency circuit 1 will be described.

As illustrated in FIG. 1, radio frequency circuit 1 includes antenna connector terminal 10, multiplexer 20, switches 31 and 32, reception circuits 41 through 47, and output terminals 51 through 57.

Antenna connector terminal 10 is one example of the first antenna connector terminal or the second antenna connector terminal, and is connected to antenna 2. In other words, the first antenna connector terminal and the second antenna connector terminal each represent a same antenna connector terminal in this embodiment. Note that antenna connector terminal 10 may comprise at least two antenna connector terminals.

Multiplexer 20 is connected to antenna connector terminal 10. Multiplexer 20 includes filters 21 through 24.

Filter 21 is one example of a first filter having a passband corresponding to a first frequency band. Filter 21 is connected between antenna connector terminal 10 and reception circuit 41 and between antenna connector terminal 10 and reception circuit 43. Filter 21 is also connected between antenna connector terminal 10 and reception circuit 45. A band having a frequency range of at least 5 gigahertz and less than a predetermined frequency may be used as the first frequency band.

Filter 22 is one example of a second filter having a passband corresponding to a second frequency band. Filter 22 is connected between antenna connector terminal 10 and reception circuit 42, and is also connected between antenna connector terminal 10 and reception circuit 44. A band having a frequency range of at least the predetermined frequency may be used as the second frequency band.

The predetermined frequency is included in an unlicensed band of at least 5 gigahertz and is used to divide the unlicensed band. For example, 6 gigahertz may be used as the predetermined frequency. 6 gigahertz used as the predetermined frequency here refers to approximately 6 gigahertz. In other words, 6 gigahertz includes, in addition to 6 gigahertz in a strict sense, a range that can be substantially regarded as 6 gigahertz, allowing, for example, a deviation of 100 megahertz or so. For example, a frequency that is at least 5.85 gigahertz and at most 6 gigahertz may be used as the predetermined frequency.

Note that the range from 5.85 gigahertz to 6 gigahertz is an example, and a frequency included in a range lower or higher than the range from 5.85 gigahertz to 6 gigahertz may be used as the predetermined frequency. For example, a frequency that is at least 5.35 gigahertz and at most 5.47 gigahertz may be used as the predetermined frequency. Alternatively, a frequency that is at least 6.875 gigahertz and at most 7.125 gigahertz may be used as the predetermined frequency.

Filter 23 has a passband corresponding to a third frequency band of less than 5 gigahertz. Filter 23 is connected between antenna connector terminal 10 and reception circuit 46. A band having a frequency range of, for example, at least 3.3 gigahertz and less than 5 gigahertz may be used as the third frequency band.

Filter 24 has a passband corresponding to a fourth frequency band lower than the third frequency band. Filter 24 is connected between antenna connector terminal 10 and reception circuit 47. A band having a frequency range of, for example, less than 3.3 gigahertz may be used as the fourth frequency band.

Switch 31 is one example of a first switch and is connected between filter 21 and reception circuits 41, 43, and 45. Switch 31 switches among (i) connecting filter 21 to reception circuit 41, (ii) connecting filter 21 to reception circuit 43, and (iii) connecting filter 21 to reception circuit 45. Note that switch 31 may be configured by a switch circuit that performs only any one of the aforementioned connections (i) through (iii) or by a switch circuit of multi-connection type capable of simultaneously performing at least two connections among the aforementioned connections (i) through (iii).

Switch 32 is one example of the second switch and is connected between filter 22 and reception circuits 42 and 44. Switch 32 switches between (iv) connecting filter 22 to reception circuit 42 and (v) connecting filter 22 to reception circuit 44. Note that switch 32 may be configured by a switch circuit that performs only either one of the aforementioned connections (iv) and (v) or by a switch circuit of multi-connection type capable of simultaneously performing both of the aforementioned connections (iv) and (v).

Reception circuit 41 is one example of a first transfer circuit or a third transfer circuit and is connected between filter 21 and output terminal 51. Reception circuit 41 transfers reception signals of a first 5G-new radio (NR) band. 5G-NR is one example of a first communication system or a second communication system and is the fifth generation mobile communication system standardized by the 3GPP. The first 5G-NR band is one example of the first communication band or a third communication band and is a communication band for 5G-NR which is included in the first frequency band of at least 5 gigahertz and less than the predetermined frequency.

Reception circuit 41 includes filter 411 and low-noise amplifier 412. Filter 411 has a passband corresponding to the first 5G-NR band. Low-noise amplifier 412 amplifies reception signals of the first 5G-NR band with low noise. Note that the circuit configuration of reception circuit 41 is an example and the circuit configuration according to the present disclosure is not limited to such configuration.

Reception circuit 42 is one example of a second transfer circuit or a fourth transfer circuit and is connected between filter 22 and output terminal 52. Reception circuit 42 transfers reception signals of a second 5G-NR band. The second 5G-NR band is one example of a second communication band or a fourth communication band and is a communication band for 5G-NR which is included in the second frequency band of at least the predetermined frequency.

Reception circuit 42 includes filter 421 and low-noise amplifier 422. Filter 421 has a passband corresponding to the second 5G-NR band. Low-noise amplifier 422 amplifies reception signals of the second 5G-NR band with low noise. Note that the circuit configuration of reception circuit 42 is an example and the circuit configuration according to the present disclosure is not limited to such configuration.

Reception circuit 43 is one example of the third transfer circuit or the first transfer circuit and is connected between filter 21 and output terminal 53. Reception circuit 43 transfers reception signals of a first WLAN band. WLAN is one example of the second communication system or the first communication system and is a communication system based on the Institute of Electrical and Electronics Engineers (IEEE) 802.11 Standard. The first WLAN band is one example of the third communication band or the first communication band and is a communication band for WLAN which is included in the first frequency band of at least 5 gigahertz and less than the predetermined frequency.

Reception circuit 43 includes filter 431 and low-noise amplifier 432. Filter 431 has a passband corresponding to the first WLAN band. Low-noise amplifier 432 amplifies reception signals of the first WLAN band with low noise. Note that the circuit configuration of reception circuit 43 is an example and the circuit configuration according to the present disclosure is not limited to such configuration.

Reception circuit 44 is one example of the fourth transfer circuit or the second transfer circuit and is connected between filter 22 and output terminal 54. Reception circuit 44 transfers reception signals of a second WLAN band. The second WLAN band is one example of the fourth communication band or the second communication band and is a communication band for WLAN which is included in the second frequency band of at least the predetermined frequency.

Reception circuit 44 includes filter 441 and low-noise amplifier 442. Filter 441 has a passband corresponding to the second WLAN band. Low-noise amplifier 442 amplifies reception signals of the second WLAN band with low noise. Note that the circuit configuration of reception circuit 44 is an example and the circuit configuration according to the present disclosure is not limited to such.

Reception circuit 45 is one example of the fifth transfer circuit and is connected between filter 21 and output terminal 55. Reception circuit 45 transfers reception signals of a first 4G-LTE band. 4G-LTE is one example of the third communication system and is the fourth generation mobile communication system standardized by the 3GPP. The first 4G-LTE band is one example of a fifth communication band and is a communication band for 4G-LTE which is included in the first frequency band of at least 5 gigahertz and less than the predetermined frequency.

Reception circuit 45 includes filter 451 and low-noise amplifier 452. Filter 451 has a passband corresponding to the first 4G-LTE band. Low-noise amplifier 452 amplifies reception signals of the first 4G-LTE band with low noise. Note that the circuit configuration of reception circuit 45 is an example and the circuit configuration according to the present disclosure is not limited to such configuration.

Reception circuit 46 is connected between filter 23 and output terminal 56. Reception circuit 46 transfers reception signals of a second 4G-LTE band, a third 5G-NR band, a third WLAN band, or any selected combination thereof. The second 4G-LTE band is a communication band for 4G-LTE which is included in the third frequency band of less than 5 gigahertz. The third 5G-NR band is a communication band for 5G-NR which is included in the third frequency band. The third WLAN band is a communication band for WLAN which is included in the third frequency band.

Reception circuit 47 is connected between filter 24 and output terminal 57. Reception circuit 47 transfers reception signals of a third 4G-LTE band, a fourth 5G-NR band, fourth WLAN band, or any selected combination thereof. The third 4G-LTE band is a communication band for 4G-LTE which is included in a fourth frequency band lower than the third frequency band. The fourth 5G-NR band is a communication band for 5G-NR which is included in the fourth frequency band. The fourth WLAN band is a communication band for WLAN which is included in the fourth frequency band.

Filters 21 through 24 and 411 through 451 may each be any one of, for example, an acoustic wave filter that uses surface acoustic waves (SAWs), an acoustic wave filter that uses bulk acoustic waves (BAWs), an LC resonance filter, or a dielectric filter, and any filter structure may be used for the filter.

Note that some or all of filters 21 through 24 may be implemented by a single component.

Note that radio frequency circuit 1 need not include filters 23 and 24, switches 31 and 32, either of reception circuit 42 or 44, and reception circuits 45, 46, and 47. In other words, filters 23 and 24, switches 31 and 32, either of reception circuit 42 or 44, and reception circuits 45, 46, and 47 are not essential elements of the radio frequency circuit according to the present disclosure. Alternatively, radio frequency circuit 1 may include transmission circuits instead of reception circuits. Alternatively, radio frequency circuit 1 may include both reception circuits and transmission circuits.

2. Concrete Examples of Communication Bands

Next, concrete examples of communication bands within an unlicensed band of at least 5 gigahertz in a plurality of communication systems will be described with reference to FIG. 2.

Figure 2:
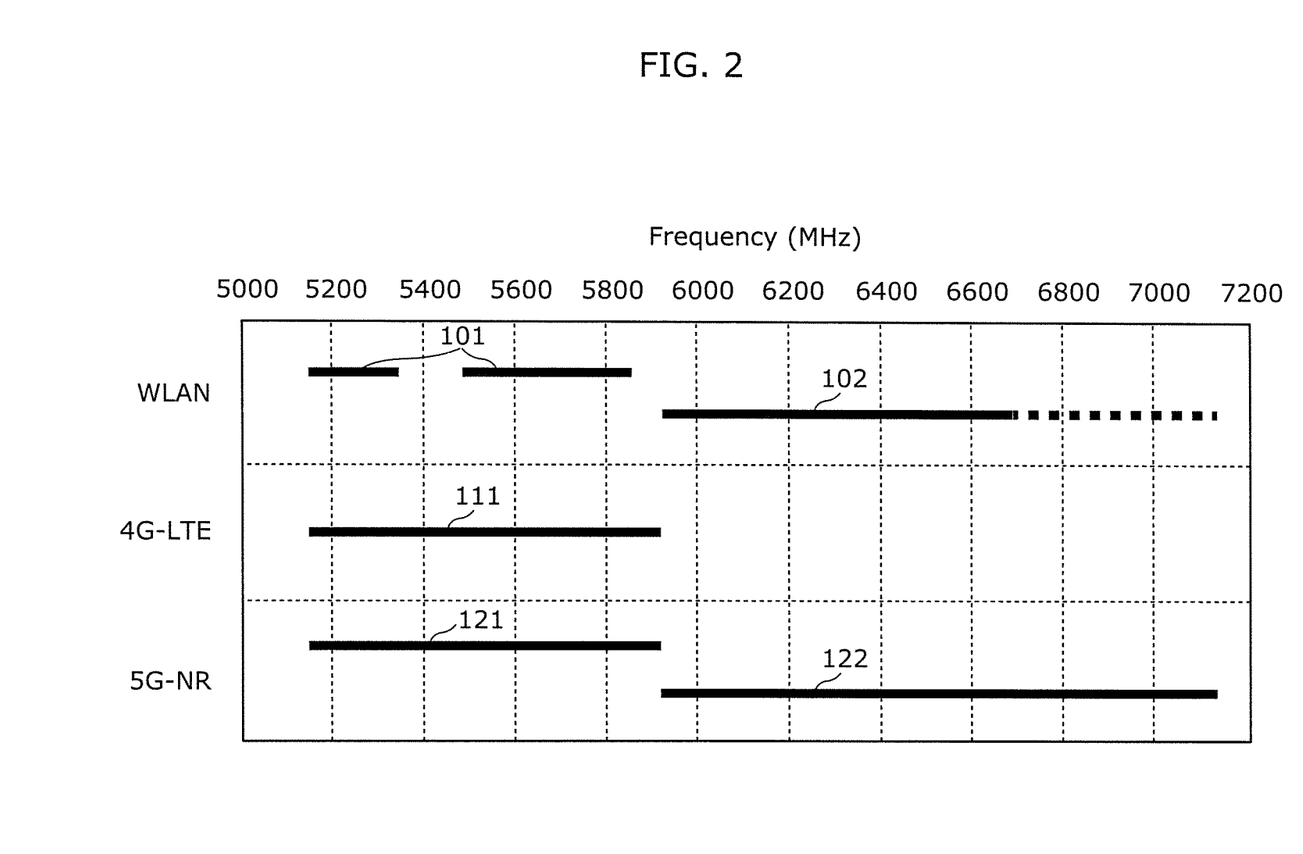
FIG. 2 is a diagram illustrating an example of a frequency range/frequency ranges in an unlicensed band of at least 5 gigahertz, which is/are usable by each of communication systems.

FIG. 2 is a diagram illustrating one example of a frequency range/frequency ranges within an unlicensed band of at least 5 gigahertz which is/are usable by each of the communication systems. In FIG. 2, the frequency range/frequency ranges of each communication system is/are presented using straight lines in association with a communication system (the vertical axis) and a frequency (the horizontal axis).

First WLAN bands 101 and second WLAN band 102 are used in WLAN. First WLAN bands 101, one included in the frequency range from 5150 megahertz to 5350 megahertz and the other included in the frequency range from 5470 megahertz to 5850 megahertz, include, for example, Unlicensed National Information Infrastructure (U-NII)-1 (having the frequency range from 5170 MHz to 5250 MHz), U-NII-2A (having the frequency range from 5250 MHz to 5350 MHz), U-NII-2C (having the frequency range from 5470 MHz to 5725 MHz), and U-NII-3 (having the frequency range from 5735 MHz to 5850 MHz). Second WLAN band 102 is included in a frequency band of at least 5925 megahertz and includes, for example, U-NII-5 (having the frequency range from 5925 MHz to 6425 MHz), U-NII-6 (having the frequency range from 6425 MHz to 6525 MHz), U-NII-7 (having the frequency range from 6525 MHz to 6875 MHz), and U-NII-8 (having the frequency range from 6875 MHz to 7125 MHz).

First 4G-LTE band 111 is used in 4G-LTE. First 4G-LTE band 111 is included in the frequency range from 5150 megahertz to 5925 megahertz and includes, for example, B 46 (having the frequency range from 5150 MHz to 5925 MHz) and B 47 (having the frequency range from 5855 MHz to 5925 MHz). B 46 may be further divided into B 46a (having the frequency range from 5150 MHz to 5250 MHz), B 46b (having the frequency range from 5250 MHz to 5350 MHz), B 46c (having the frequency range from 5470 MHz to 5725 MHz), and B 46d (having the frequency range from 5735 MHz to 5925 MHz).

First 5G-NR band 121 and second 5G-NR band 122 are used in 5G-NR. First 5G-NR band 121 is included in the frequency range from 5170 megahertz to 5850 megahertz and includes, for example, U-NII-1, U-NII-2A, U-NII-2B (having the frequency range from 5350 MHz to 5470 MHz), U-NII-2C, U-NII-3, and U-NII-4 (having the frequency range from 5850 MHz to 5925 MHz). Second 5G-NR band 122 is included in the frequency range from 5925 megahertz to 7125 megahertz and includes, for example, U-NII-5, U-NII-6, U-NII-7, and U-NII-8. Second 5G-NR band 122 may include n 46 (having the frequency range from 5150 MHz to 5925 MHz).

Note that "U-NII" is a name for the communication bands within an unlicensed band defined by the Federal Communication Commission (FCC) and is referred to as "NR-U" in the 3GPP. If NR-U bands are standardized in the 3GPP, NR-U bands may be used in 5G-NR.

Note that the above-described frequencies of each of the aforementioned communication bands are examples and the frequencies of each of the communication bands according to the present disclosure are not limited to such.

3. Circuit State of and Flows of Signals in Radio Frequency Circuit 1

Radio frequency circuit 1 configured as described above is capable of simultaneously transferring radio frequency signals of communication bands of different communication systems within an unlicensed band. Radio frequency circuit 1 is capable of performing the following operations (1) through (5).

Simultaneous executions of: the reception of a radio frequency signal of the first 4G-LTE band by reception circuit 45; the reception of a radio frequency signal of the second 5G-NR band by reception circuit 42; and the reception of a radio frequency signal of the third 4G-LTE band by reception circuit 47.

Simultaneous executions of: the reception of a radio frequency signal of the first WLAN band by reception circuit 43; the reception of a radio frequency signal of the second 5G-NR band by reception circuit 42; and the reception of a radio frequency signal of the third 5G-NR band by reception circuit 46.

Simultaneous executions of: the reception of a radio frequency signal of the first 5G-NR band by reception circuit 41; the reception of a radio frequency signal of the second WLAN band by reception circuit 44; and the reception of a radio frequency signal of the third 5G-NR band by reception circuit 46.

Simultaneous executions of: the reception of a radio frequency signal of the first 5G-NR band by reception circuit 41; and the reception of a radio frequency signal of the second 5G-NR band by reception circuit 42.

Simultaneous executions of: the reception of a radio frequency signal of the first WLAN band by reception circuit 43; and the reception of a radio frequency signal of the second WLAN band by reception circuit 44.

A circuit state and the flows of signals in each of the aforementioned operations (1) through (5) will be described with reference to FIG. 3 through FIG. 5.

Figure 3:
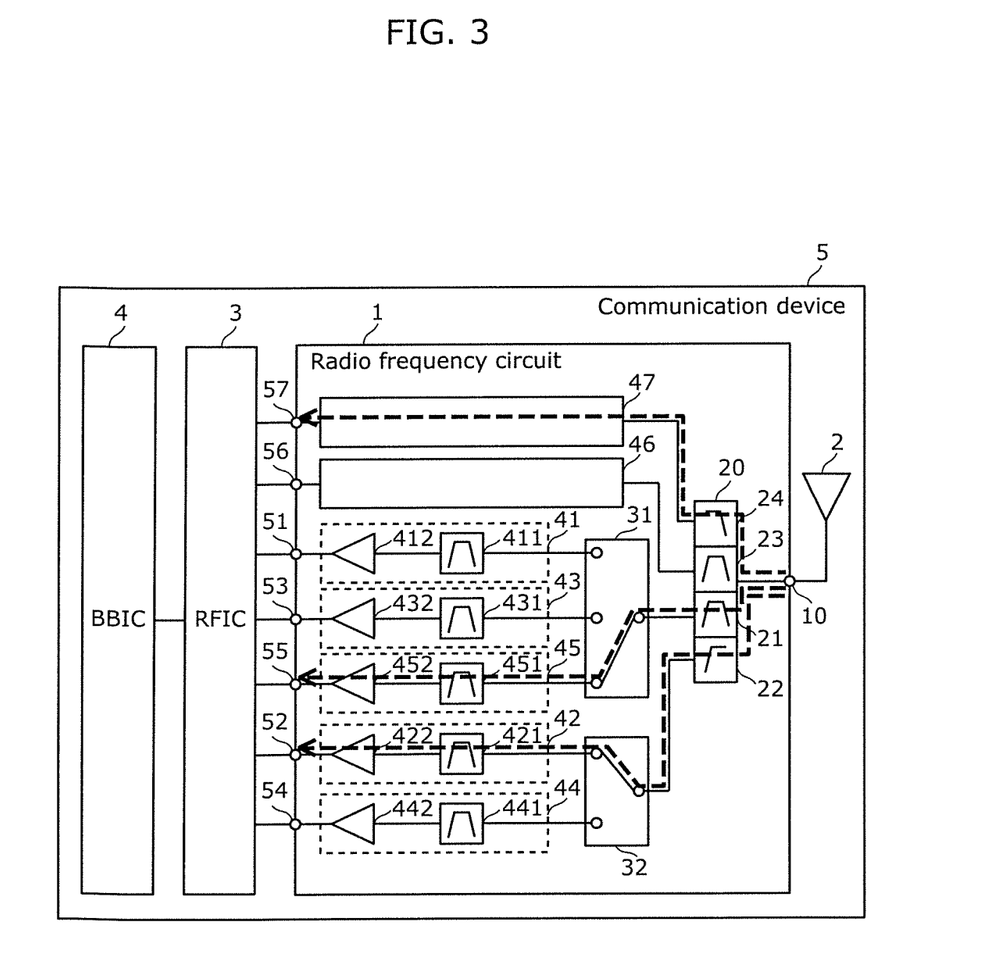
FIG. 3 is a circuit diagram illustrating a first connection example of the radio frequency circuit according to the embodiment.

FIG. 3 is a circuit diagram illustrating a first connection example in radio frequency circuit 1 according to the embodiment. Specifically, FIG. 3 illustrates a connection example in the simultaneous use of LTE-LAA and a 5G-NR band within an unlicensed band (hereinafter referred to as "NR-U band"). FIG. 3 illustrates a circuit state and the flows of signals (see the dashed arrows) in the aforementioned operation (1).

In order to achieve the circuit state illustrated in FIG. 3, RFIC 3 controls the connection state of each of the switches in radio frequency circuit 1. Specifically, RFIC 3 causes switch 31 to connect filter 21 to reception circuit 45 and causes switch 32 to connect filter 22 to reception circuit 42. With such connections, a reception signal of the first 4G-LTE band passing via antenna 2, filter 21, switch 31, and reception circuit 45 is inputted from output terminal 55 to RFIC 3. Moreover, a reception signal of the second 5G-NR band passing via antenna 2, filter 22, switch 32, and reception circuit 42 is inputted from output terminal 52 to RFIC 3. Furthermore, a reception signal of the third 4G-LTE band passing via antenna 2, filter 24, and reception circuit 47 is inputted from output terminal 57 to RFIC 3.

In FIG. 3, for the utilization of LTE-LAA, reception circuit 47 which transfers reception signals of the third 4G-LTE band within the unlicensed band is connected to antenna connector terminal 10 via filter 24, and reception circuit 45 which transfers reception signals of the first 4G-LTE band within the unlicensed band is connected to antenna 2 via filter 21, as described above. On the other hand, in the NR-U band, reception circuit 41 which transfers reception signals of the first 5G-NR band that overlaps the band used by LAA (the first 4G-LTE band) is not connected to antenna connector terminal 10, and reception circuit 42 which transfers reception signals of the second 5G-NR band that does not overlap the band used by LAA is connected to antenna connector terminal 10 via filter 22.

Figure 4:
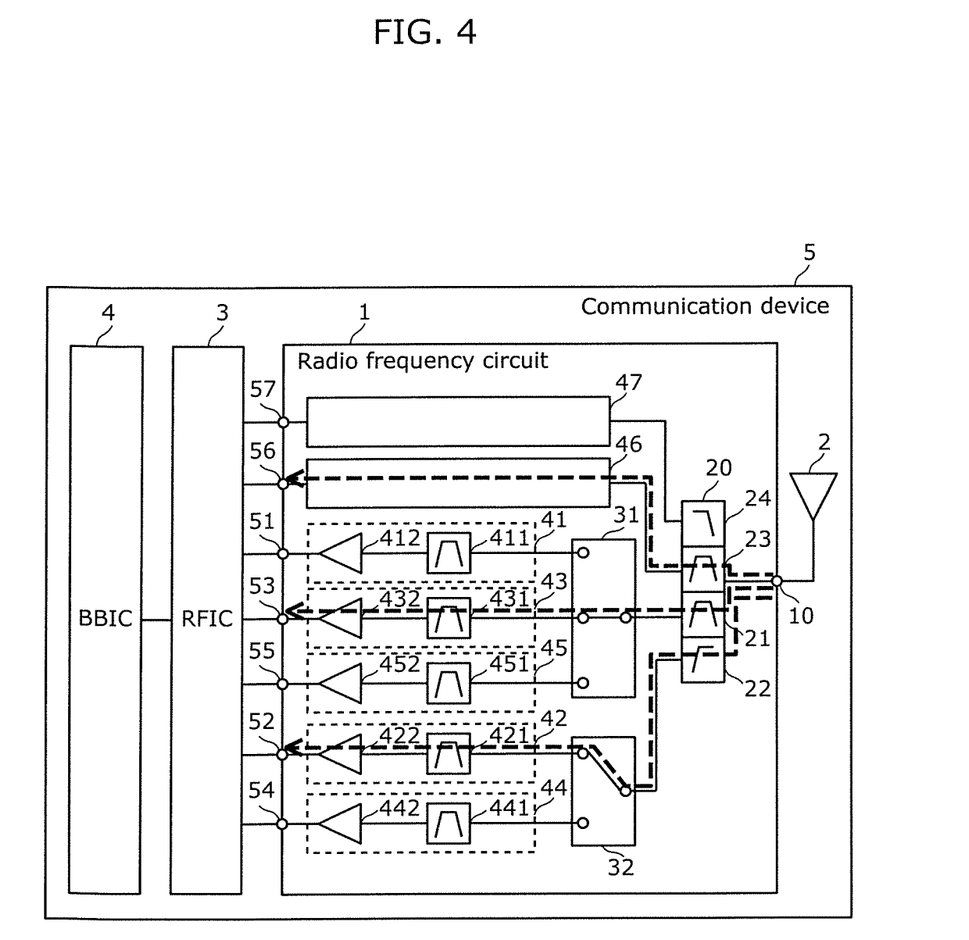
FIG. 4 is a circuit diagram illustrating a second connection example of the radio frequency circuit according to the embodiment.

FIG. 4 is a circuit diagram illustrating a second connection example in radio frequency circuit 1 according to the embodiment. Specifically, FIG. 4 illustrates a connection example in the simultaneous use of: an NR band within a licensed band; and an NR-U band and a WLAN band within an unlicensed band. FIG. 4 illustrates a circuit state and the flows of signals (see the dashed arrows) in the aforementioned operation (2).

In order to achieve the circuit state illustrated in FIG. 4, RFIC 3 controls the connection state of each of the switches in radio frequency circuit 1. Specifically, RFIC 3 causes switch 31 to connect filter 21 to reception circuit 43 and causes switch 32 to connect filter 22 to reception circuit 42. With such connections, a reception signal of the first WLAN band passing via antenna 2, filter 21, switch 31, and reception circuit 43 is inputted from output terminal 53 to RFIC 3. Moreover, a reception signal of the second 5G-NR band passing via antenna 2, filter 22, switch 32, and reception circuit 42 is inputted from output terminal 52 to RFIC 3. Furthermore, a reception signal of the third 5G-NR band passing via antenna 2, filter 23, and reception circuit 46 is inputted from output terminal 56 to RFIC 3.

In FIG. 4, for the utilization of WLAN, reception circuit 43 which transfers reception signals of the first WLAN band within the licensed band is connected to antenna connector terminal 10 via filter 21, as described above. On the other hand, for the utilization of NR-U, reception circuit 41 which transfers reception signals of the first 5G-NR band that overlaps the band used by WLAN (the first WLAN band) is not connected to antenna connector terminal 10, and reception circuit 42 which transfers reception signals of the second 5G-NR band that does not overlap the band used by WLAN is connected to antenna connector terminal 10 via filter 22.

Figure 5:
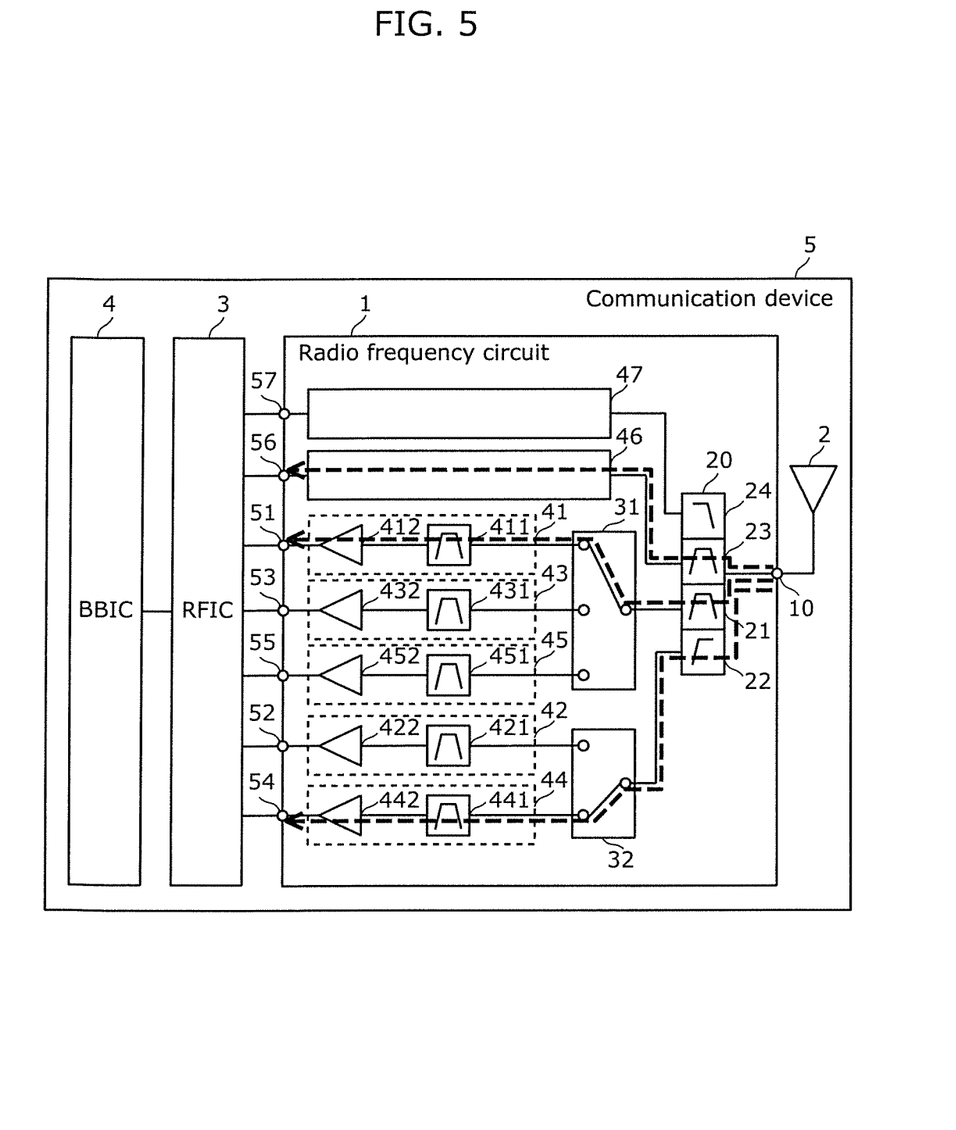
FIG. 5 is a circuit diagram illustrating a third connection example of the radio frequency circuit according to the embodiment.

FIG. 5 is a circuit diagram illustrating a third connection example in radio frequency circuit 1 according to the embodiment. Specifically, FIG. 5 illustrates a connection example in the simultaneous use of: an NR-U band within a licensed band; and an NR-U band and a WLAN band within an unlicensed band. FIG. 5 illustrates a circuit state and the flows of signals (see the dashed arrows) in the aforementioned operation (3).

In order to achieve the circuit state illustrated in FIG. 5, RFIC 3 controls the connection state of each of the switches in radio frequency circuit 1. Specifically, RFIC 3 causes switch 31 to connect filter 21 to reception circuit 41 and causes switch 32 to connect filter 22 to reception circuit 44. With such connections, a reception signal of the first 5G-NR band passing via antenna 2, filter 21, switch 31, and reception circuit 41 is inputted from output terminal 51 to RFIC 3. Moreover, a reception signal of the second WLAN band passing via antenna 2, filter 22, switch 32, and reception circuit 44 is inputted from output terminal 54 to RFIC 3. Furthermore, a reception signal of the third 5G-NR band passing via antenna 2, filter 23, and reception circuit 46 is inputted from output terminal 56 to RFIC 3.

In FIG. 5, for the utilization of WLAN, reception circuit 44 which transfers reception signals of the second WLAN band within the unlicensed band is connected to antenna connector terminal 10 via filter 22, as described above. On the other hand, for the utilization of NR-U, reception circuit 42 which transfers reception signals of the second 5G-NR band that overlaps the band used by WLAN (the second WLAN band) is not connected to antenna connector terminal 10, and reception circuit 41 which transfers reception signals of the first 5G-NR band that does not overlap the band used by WLAN is connected to antenna connector terminal 10 via filter 21.

Figure 6:
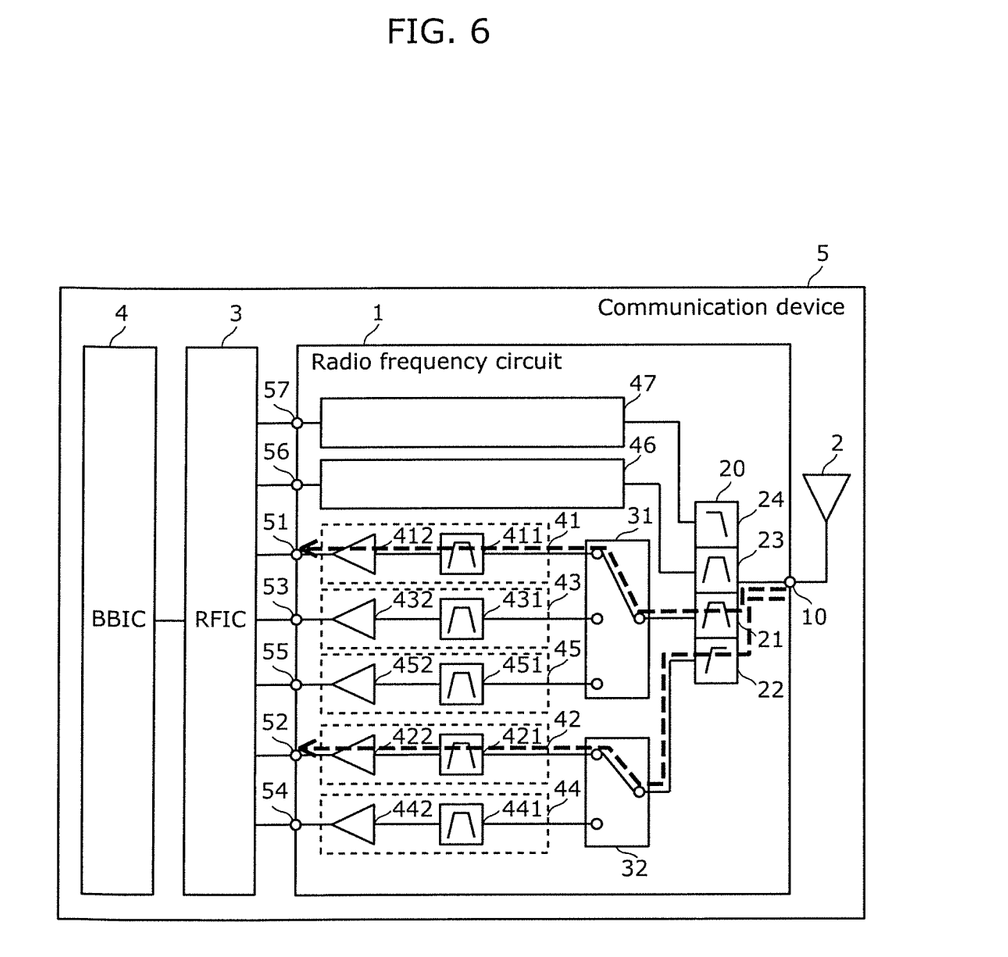
FIG. 6 is a circuit diagram illustrating a fourth connection example of the radio frequency circuit according to the embodiment.

FIG. 6 is a circuit diagram illustrating a fourth connection example in radio frequency circuit 1 according to the embodiment. Specifically, FIG. 6 illustrates a connection example in the case of not using a WLAN band but simultaneously using two NR-U bands within an unlicensed band. FIG. 6 illustrates a circuit state and the flows of signals (see the dashed arrows) in the aforementioned operation (4).

In order to achieve the circuit state illustrated in FIG. 6, RFIC 3 controls the connection state of each of the switches in radio frequency circuit 1. Specifically, RFIC 3 causes switch 31 to connect filter 21 to reception circuit 41 and causes switch 32 to connect filter 22 to reception circuit 42. With such connections, a reception signal of the first 5G-NR band passing via antenna 2, filter 21, switch 31, and reception circuit 41 is inputted from output terminal 51 to RFIC 3. Moreover, a reception signal of the second 5G-NR band passing via antenna 2, filter 22, switch 32, and reception circuit 42 is inputted from output terminal 52 to RFIC 3.

In FIG. 6, for the utilization of NR-U in a wide band, reception circuit 41 which transfers reception signals of the first 5G-NR band is connected to antenna connector terminal 10 via filter 21, and reception circuit 42 which transfers reception signals of the second 5G-NR band is connected to antenna connector terminal 10 via filter 22, as described above.

Figure 7:
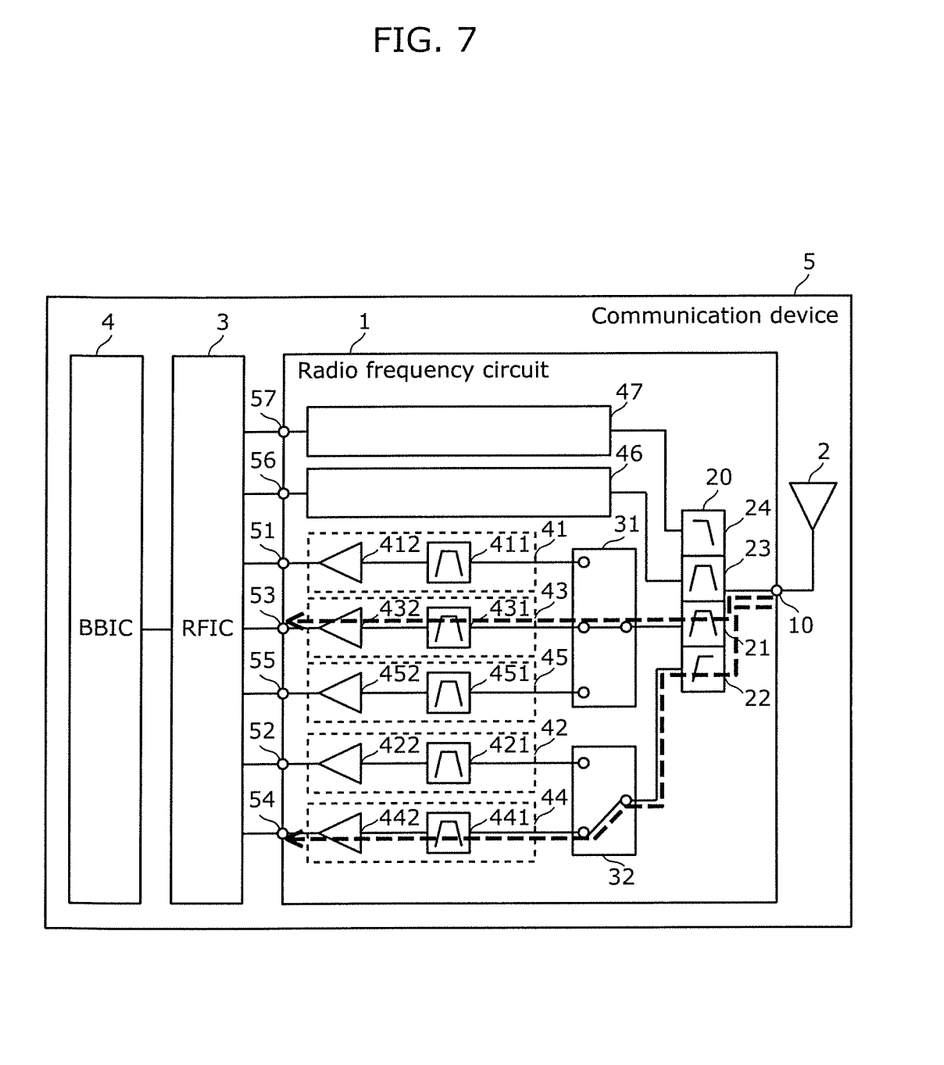
FIG. 7 is a circuit diagram illustrating a fifth connection example of the radio frequency circuit according to the embodiment.

FIG. 7 is a circuit diagram illustrating a fifth connection example in radio frequency circuit 1 according to the embodiment. Specifically, FIG. 7 illustrates a connection example in the case of not using an NR-U band but simultaneously using two WLAN bands within an unlicensed band. FIG. 7 illustrates a circuit state and the flows of signals (see the dashed arrows) in the aforementioned operation (5).

In order to achieve the circuit state illustrated in FIG. 7, RFIC 3 controls the connection state of each of the switches in radio frequency circuit 1. Specifically, RFIC 3 causes switch 31 to connect filter 21 to reception circuit 43 and causes switch 32 to connect filter 22 to reception circuit 44. With such connections, a reception signal of the first WLAN band passing via antenna 2, filter 21, switch 31, and reception circuit 43 is inputted from output terminal 53 to RFIC 3. Moreover, a reception signal of the second WLAN band passing via antenna 2, filter 22, switch 32, and reception circuit 44 is inputted from output terminal 54 to RFIC 3.

In FIG. 7, for the utilization of WLAN in a wide band, reception circuit 43 which transfers reception signals of the first WLAN band is connected to antenna connector terminal 10 via filter 21, and reception circuit 44 which transfers reception signals of the second WLAN band is connected to antenna connector terminal 10 via filter 22, as described above.

Note that a circuit state of and the flows of signals in radio frequency circuit 1 are not limited to those described for each of the aforementioned operations (1) through (5) with reference to FIG. 3 through FIG. 7.

As described above, radio frequency circuit 1 according to this embodiment includes: filter 21 having a passband corresponding to a first frequency band of at least 5 gigahertz and less than a predetermined frequency; filter 22 having a passband corresponding to a second frequency band of at least the predetermined frequency; a first transfer circuit (one of reception circuit 41 and reception circuit 43) that transfers a signal of a first communication band for a first communication system, the first communication band being included in the first frequency band; a second transfer circuit (one of reception circuit 42 and reception circuit 44) that transfers a signal of a second communication band for the first communication system, the second communication band being included in the second frequency band; a third transfer circuit (the other of reception circuit 41 and reception circuit 43) that transfers a signal of a third communication band for a second communication system different from the first communication system, the third communication band being included in the first frequency band; and switch 31 that switches connection of filter 21 between the first transfer circuit and the third transfer circuit. Filter 21 is connected between antenna connector terminal 10 and the first transfer circuit and between antenna connector terminal 10 and the third transfer circuit. Filter 22 is connected between antenna connector terminal 10 and the second transfer circuit. One of the first communication system or the second communication system is a wireless local area network system.

With this configuration, it is possible to simultaneously use the second communication band for the first communication system, which is included in the second frequency of at least a predetermined frequency, and the third communication band for the second communication system, which is included in the first frequency band of at least 5 gigahertz and less than the predetermined frequency. With filter 21 and filter 22, it is possible to enhance isolation between the second transfer circuit and the third transfer circuit, and thus effectively use an unlicensed band of at least 5 gigahertz, with high quality being appreciated, in a WLAN system and another communication system. Moreover, it is possible to simultaneously use the first communication band and the second communication band for the first communication system to enable wide-band communications when the third communication band for the second communication system is not used. With filter 21 and filter 22, it is possible to enhance isolation between the second transfer circuit and the third transfer circuit, and thus effectively use an unlicensed band of at least 5 gigahertz, with high quality being appreciated, even when the first communication system alone is used.

For example, radio frequency circuit 1 according to this embodiment may further include a fourth transfer circuit (the other of reception circuit 42 and reception circuit 44) that transfers a signal of a fourth communication band for the second communication system, the fourth communication band being included in the second frequency band; and switch 32 that switches connection of filter 22 between the second transfer circuit and the fourth transfer circuit. Filter 22 may be connected between antenna connector terminal 10 and the second transfer circuit and between antenna connector terminal 10 and the fourth transfer circuit.

With such connections, it is possible to simultaneously use the first communication band for the first communication system and the fourth communication band for the second communication system, in addition to the simultaneous use of the second communication band for the first communication system and the third communication band for the second communication system. In either of these simultaneous uses, it is possible, with filter 21 and filter 22, to enhance isolation between the circuits. Moreover, it is possible to simultaneously use the third communication band and the fourth communication band for the second communication system to achieve wide-band communications when the first communication band and the second communication band for the second communication system are not used. With filter 21 and filter 22, it is possible to enhance isolation between the third transfer circuit and the fourth transfer circuit, and thus effectively use an unlicensed band of at least 5 gigahertz, with high quality being appreciated, even when the second communication system alone is used.

For example, in radio frequency circuit 1 according to this embodiment, when the first communication system and the second communication system are simultaneously used in the first frequency band and the second frequency band, (i) switch 31 may connect the third transfer circuit to filter 21 and switch 32 may connect the second transfer circuit to filter 22 or (ii) switch 31 may connect the first transfer circuit to filter 21 and switch 32 may connect the fourth transfer circuit to filter 22.

With such connections, by thus controlling switch 31 and switch 32, it is possible to execute either of the following: the simultaneous use of the second communication band for the first communication system and the third communication band for the second communication system; or the simultaneous use of the first communication band for the first communication system and the fourth communication band for the second communication system.

For example, in radio frequency circuit 1 according to this embodiment, the other of the first communication system and the second communication system may be a mobile communication system.

With this feature, it is possible to ensure necessary isolation in the simultaneous use of an unlicensed band of at least 5 gigahertz in a WLAN communication system and a mobile communication system.

For example, in radio frequency circuit 1 according to this embodiment, the mobile communication system may be the fifth generation mobile communication system.

With this feature, it is possible to ensure necessary isolation in the simultaneous use of an unlicensed band of at least 5 gigahertz in a WLAN communication system and the 5G.

For example, radio frequency circuit 1 according to this embodiment may further include a fifth transfer circuit (reception circuit 45) that transfers a signal of a fifth communication band for a third communication system, the fifth communication band being included in the first frequency band. Switch 31 may switch connection of filter 21 among the first transfer circuit, the third transfer circuit, and the fifth transfer circuit. Filter 21 may be connected between antenna connector terminal 10 and the first transfer circuit, between antenna connector terminal 10 and the third transfer circuit, and between antenna connector terminal 10 and the fifth transfer circuit. The third communication system may be the fourth generation mobile communication system.

With this configuration, it is possible to simultaneously use the fifth communication band for the 4G and the second communication band for the 5G or the WLAN, and thus more effectively use an unlicensed band while ensuring isolation between the circuits.

For example, in radio frequency circuit 1 according to this embodiment, the predetermined frequency may be at least 5.85 gigahertz and at most 6 gigahertz.

With this feature, it is possible to simultaneously use a communication band of less than about 6 gigahertz, which is included in an unlicensed band of at least 5 gigahertz, and a communication band of at least about 6 gigahertz.

For example, in radio frequency circuit 1 according to this embodiment, the predetermined frequency may be at least 5.35 gigahertz and at most 5.47 gigahertz.

With this feature, it is possible to divide an unlicensed band by a frequency that is at least 5.35 gigahertz and at most 5.47 gigahertz to simultaneously use communication bands.

For example, in radio frequency circuit 1 according to this embodiment, the predetermined frequency may be at least 6.875 gigahertz and at most 7.125 gigahertz.

With this feature, it is possible to divide an unlicensed band by a frequency that is at least 6.875 gigahertz and at most 7.125 gigahertz to simultaneously use communication bands.

Moreover, communication device 5 according to this embodiment includes: RFIC 3 that processes radio frequency signals transmitted or received by antenna 2; and radio frequency circuit 1 that transfers the radio frequency signals between antenna 2 and RFIC 3.

With this configuration, it is possible to produce the same advantageous effects as attained by aforementioned radio frequency circuit 1.

Figure 8:
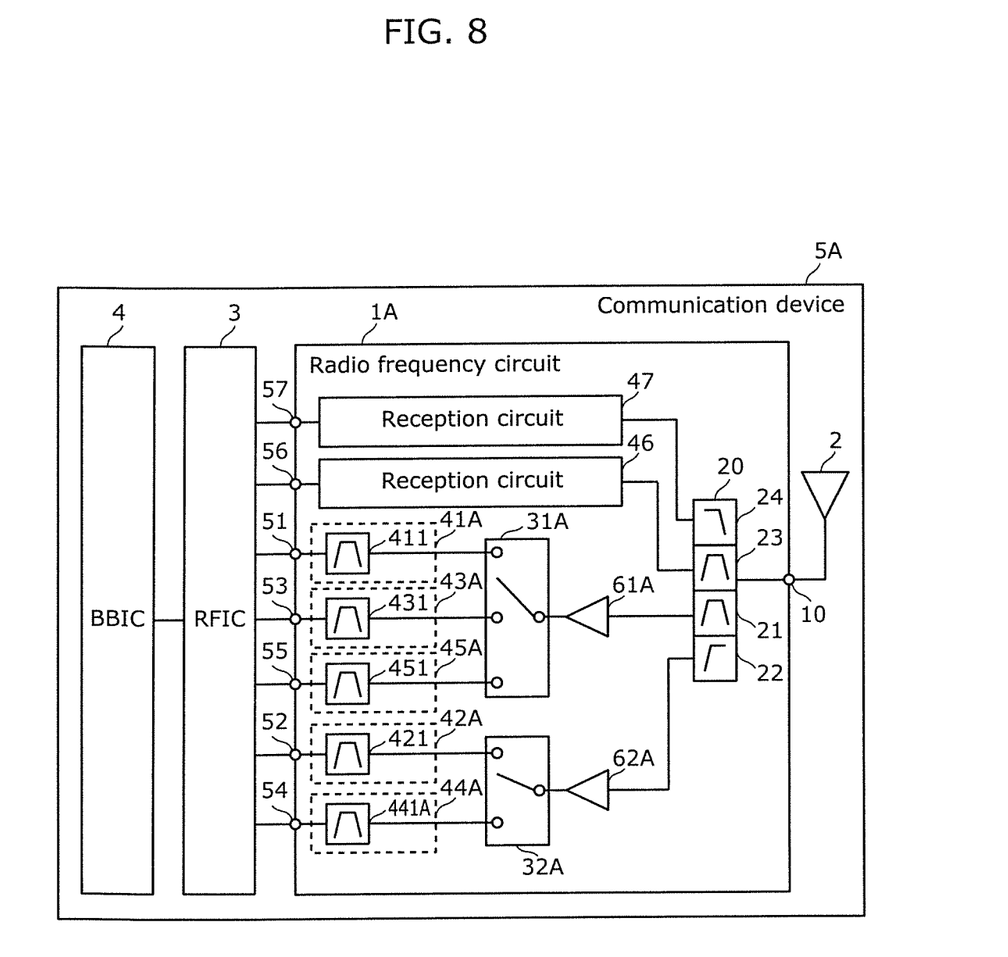
FIG. 8 is a circuit configuration diagram of a radio frequency circuit and a communication device according to a variation of the embodiment.

Next, a variation of the aforementioned embodiment will be described. Although each reception circuit includes a low-noise amplifier in the aforementioned embodiment, a low-noise amplifier is not included in each reception circuit and is commonly used by a plurality of reception circuits in this variation. The following describes the variation, focusing on the differences from the aforementioned embodiment.

FIG. 8 is a circuit configuration diagram of radio frequency circuit 1 and communication device 5A according to the variation. Communication device 5A according to this variation includes radio frequency circuit 1A, antenna 2, RFIC 3, and BBIC 4. Radio frequency circuit 1A includes antenna connector terminal 10, multiplexer 20, switches 31A and 32A, reception circuits 41A through 47A, output terminals 51 through 57, and low-noise amplifiers 61A and 62A.

Low-noise amplifier 61A is connected between filter 21 and switch 31A. Low-noise amplifier 61A is capable of amplifying reception signals of the first frequency band. Low-noise amplifier 62A is connected between filter 22 and switch 32A. Low-noise amplifier 62A is capable of amplifying reception signals of the second frequency band.

Switch 31A is one example of the first switch and is connected between filter 21 and reception circuits 41A, 43A, and 45A via low-noise amplifier 61A. Switch 32A is one example of the second switch and is connected between filter 22 and reception circuits 42A and 44A via low-noise amplifier 62A.

Reception circuit 41A is one example of the first transfer circuit or the third transfer circuit and is connected between filter 21 and output terminal 51. Reception circuit 41 includes filter 411 and transfers reception signals of the first 5G-NR band.

Reception circuit 42A is one example of the second transfer circuit or the fourth transfer circuit and is connected between filter 22 and output terminal 52. Reception circuit 42A includes filter 421 and transfers reception signals of the second 5G-NR band.

Reception circuit 43A is one example of the third transfer circuit or the first transfer circuit and is connected between filter 21 and output terminal 53. Reception circuit 43A includes filter 431 and transfers reception signals of the first WLAN band.

Reception circuit 44A is one example of the fourth transfer circuit or the second transfer circuit and is connected between filter 22 and output terminal 54. Reception circuit 44A includes filter 441 and transfers reception signals of the second WLAN band.

Reception circuit 45A is one example of a fifth transfer circuit and is connected between filter 21 and output terminal 55. Reception circuit 45A includes filter 451 and transfers reception signals of the first 4G-LTE band.

As described above, in this variation, it is possible to commonly share a low-noise amplifier among a plurality of bands and thus reduce more the number of components in radio frequency circuit 1A to achieve miniaturization thereof, as compared to the aforementioned embodiment. Moreover, it is possible to effectively use, even in this variation, an unlicensed band of at least 5 gigahertz with high quality being appreciated in a WLAN system and another communication system, as is the case described in the aforementioned embodiment.

Although a low-noise amplifier is included in each communication system, a same low-noise amplifier may be commonly used by different communication systems.

OTHER EMBODIMENTS

Although the radio frequency circuit and the communication device according to the present disclosure have been described above based on an exemplary embodiment and a variation thereof, the radio frequency circuit and the communication device according to the present disclosure are not limited to the foregoing embodiment and variation thereof. The present invention also encompasses other embodiments achieved by combining arbitrary elements in the above embodiment and variation thereof, variations resulting from various modifications to the embodiment and variation thereof that may be conceived by those skilled in the art without departing from the essence of the present disclosure, and various devices that include the radio-frequency circuit and the communication device according to the embodiment and variation thereof.

For example, in the radio frequency circuit and the communication device according to the aforementioned embodiment, a switch circuit and/or a matching circuit including an inductor and/or a capacitor may be connected between circuit elements. For example, the matching circuit and/or the switch circuit may be connected between filter 21 and antenna connector terminal 10. Note that the inductor may comprise a wire inductor including a wire that forms a connection between circuit elements.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The present disclosure can be widely used in communication devices such as mobile phones, as a radio frequency circuit or a communication device capable of simultaneously using an unlicensed band of at least 5 gigahertz in a plurality of communication systems.

The invention claimed is:
1. A radio frequency circuit, comprising:
 a first filter having a passband corresponding to a first frequency band of at least 5 gigahertz and less than a predetermined frequency;
 a second filter having a passband corresponding to a second frequency band of at least the predetermined frequency;

a first transfer circuit configured to transfer a signal of a first communication band for a first communication system, the first communication band being included in the first frequency band;

a second transfer circuit configured to transfer a signal of a second communication band for the first communication system, the second communication band being included in the second frequency band;

a third transfer circuit configured to transfer a signal of a third communication band for a second communication system different from the first communication system, the third communication band being included in the first frequency band;

a first switch configured to switch connection of the first filter between the first transfer circuit and the third transfer circuit;

a fourth transfer circuit configured to transfer a signal of a fourth communication band for the second communication system, the fourth communication band being included in the second frequency band; and a second switch configured to switch connection of the second filter between the second transfer circuit and the fourth transfer circuit, wherein the second filter is connected between the second antenna connector terminal and the second transfer circuit and between the second antenna connector terminal and the fourth transfer circuit, wherein the first filter is connected between a first antenna connector terminal and the first transfer circuit and between the first antenna connector terminal and the third transfer circuit, the second filter is connected between a second antenna connector terminal and the second transfer circuit, one of the first communication system or the second communication system is a wireless local area network system, and when the first communication system and the second communication system are simultaneously used in the first frequency band and the second frequency band:

(i) the first switch is configured to connect the third transfer circuit to the first filter and the second switch is configured to connect the second transfer circuit to the second filter, or (ii) the first switch is configured to connect the first transfer circuit to the first filter and the second switch is configured to connect the fourth transfer circuit to the second filter.

2. The radio frequency circuit according to claim 1, wherein
the other of the first communication system and the second communication system is a mobile communication system.

3. The radio frequency circuit according to claim 2, wherein
the mobile communication system is a fifth generation mobile communication system.

4. The radio frequency circuit according to claim 3, further comprising:
a fifth transfer circuit configured to transfer a signal of a fifth communication band for a third communication system, the fifth communication band being included in the first frequency band, wherein
the first switch is configured to switch connection of the first filter among the first transfer circuit, the third transfer circuit, and the fifth transfer circuit,
the first filter is connected between the first antenna connector terminal and the first transfer circuit, between the first antenna connector terminal and the third transfer circuit, and between the first antenna connector terminal and the fifth transfer circuit, and
the third communication system is a fourth generation mobile communication system.

5. The radio frequency circuit according to claim 1, wherein
the predetermined frequency is at least 5.85 gigahertz and at most 6 gigahertz.

6. The radio frequency circuit according to claim 1, wherein
the predetermined frequency is at least 5.35 gigahertz and at most 5.47 gigahertz.

7. The radio frequency circuit according to claim 1, wherein
the predetermined frequency is at least 6.875 gigahertz and at most 7.125 gigahertz.

8. A communication device, comprising:
a signal processing circuit configured to process a radio frequency signal; and
the radio frequency circuit according to claim 1 configured to transfer the radio frequency signal between an antenna and the signal processing circuit.

* * * * *